United States Patent [19]

Lane

[11] 4,151,646
[45] May 1, 1979

[54] FLEXIBLE LINE TRIMMER WITH LINE FEEDING APPARATUS

[75] Inventor: Joseph J. Lane, Hurst, Tex.
[73] Assignee: K & S Industries, Inc., Fort Worth, Tex.
[21] Appl. No.: 881,178
[22] Filed: Feb. 27, 1978
[51] Int. Cl.$^2$ .................. A01D 55/18; B26B 27/00
[52] U.S. Cl. ........................................ 30/276; 56/12.7
[58] Field of Search ............... 30/276, 347; 56/12.7, 56/295; 51/335

[56] References Cited

U.S. PATENT DOCUMENTS

| | | | |
|---|---|---|---|
| 2,709,323 | 5/1955 | Swan | 51/335 |
| 3,928,911 | 12/1975 | Pittinger | 30/276 |
| 4,091,536 | 5/1978 | Bartholomew | 30/276 |
| 4,095,338 | 6/1978 | Naohiko | 30/276 |
| 4,104,796 | 8/1978 | Sheldon | 30/276 |
| 4,107,901 | 8/1978 | Moore | 56/17.5 |
| 4,118,864 | 10/1978 | Pittinger | 30/276 |

Primary Examiner—Jimmy C. Peters
Attorney, Agent, or Firm—Robert A. Felsman

[57] ABSTRACT

A flexible line trimmer for cutting vegetation having a rotary drive for swinging a nylon line, and a device for feeding out additional line while rotating. A housing with an actuator button on its bottom is carried by the drive shaft. A spool having drive teeth formed on one side is carried in the housing. An actuator is mounted reciprocally in the housing and has a pin for engaging the drive teeth to cause the spool to rotate with the housing. An actuator shaft extends between the button and the actuator for disengaging the pin when the button is depressed. Guide teeth on the spool guide the pin back into engagement with the next drive tooth, incrementally advancing the line.

10 Claims, 5 Drawing Figures

FLEXIBLE LINE TRIMMER WITH LINE FEEDING APPARATUS

BACKGROUND OF THE INVENTION

1. Field of the Invention

This invention relates in general to flexible line trimmers for cutting vegetation, and in particular to one that has a mechanism for feeding line out while still rotating.

2. Description of the Prior Art

One type of weed and grass cutter in use utilizes a monofilament nylon line for cutting the vegetation. The line is wound on a spool that is rotated by a rotary drive. A free traveling end extends outward from the spool a few inches, cutting vegetation in its path.

One disadvantage of the trimmer is that the line wears fairly rapidly. To extend the line to its proper length, most devices have a feeding mechanism that requires the operator to stop the rotation. The operator has to turn the trimmer over, manipulate a release, grasp the free end of the line and pull more out. This is a time consuming operation and a nuisance.

One proposal to provide for line feeding while still rotating is shown in U.S. Pat. No. 3,928,911. It requires, however, a hollow shaft, gripping members and a linkage extending up to the handle. If is desirable to have one that feeds additional line out merely by bumping the housing against the ground.

It also would be desirable to install an automatic line feeding device on existing trimmers as a replacement for the manual line feeder housing. The existing units have housings that are normally retained by a nut threaded onto the drive shaft at the bottom of the housing. A relatively long shaft interferes with placement of an axially moveable button on the bottom for advancing line.

SUMMARY OF THE INVENTION

It is accordingly a general object of this invention to provide an improved flexible line vegetation trimmer.

It is a further object of this invention to provide a flexible line vegetation trimmer that has an improved device for advancing the line while rotating.

It is a further object to provide a line feeding device that advances line while rotating, and is adaptable to existing trimmers.

In accordance with these objects, a filament trimmer is provided that has a mechanism for advancing line when the trimmer is bumped on the ground. The housing contains a sliding actuator that is reciprocal in a plane transverse to the drive shaft. The actuator has a pin on one end for engaging drive teeth formed on the side of the spool. In the engaged position, the drive teeth lock the spool to the housing for rotation therewith. In the disengaged position, the pin is removed from the path of the drive teeth to allow the housing to rotate with respect to the spool, feeding out the additional line. The actuator contains a wedge member on its other end that is engaged by a tapered shaft which is in turn connected to an actuator button mounted below the housing. Axial movement of the button slides the tapered shaft against the wedge-member, causing the actuator to move into disengagement. Guide teeth are formed radially inward from the drive teeth to direct the pin back into engagement with the next drive tooth, incrementally advancing the line. The excess length of the drive shaft on existing units is dealt with by allowing it to fit slidingly in the actuator shaft, which is hollow.

DESCRIPTION OF THE PREFERRED EMBODIMENT

Figure 1:
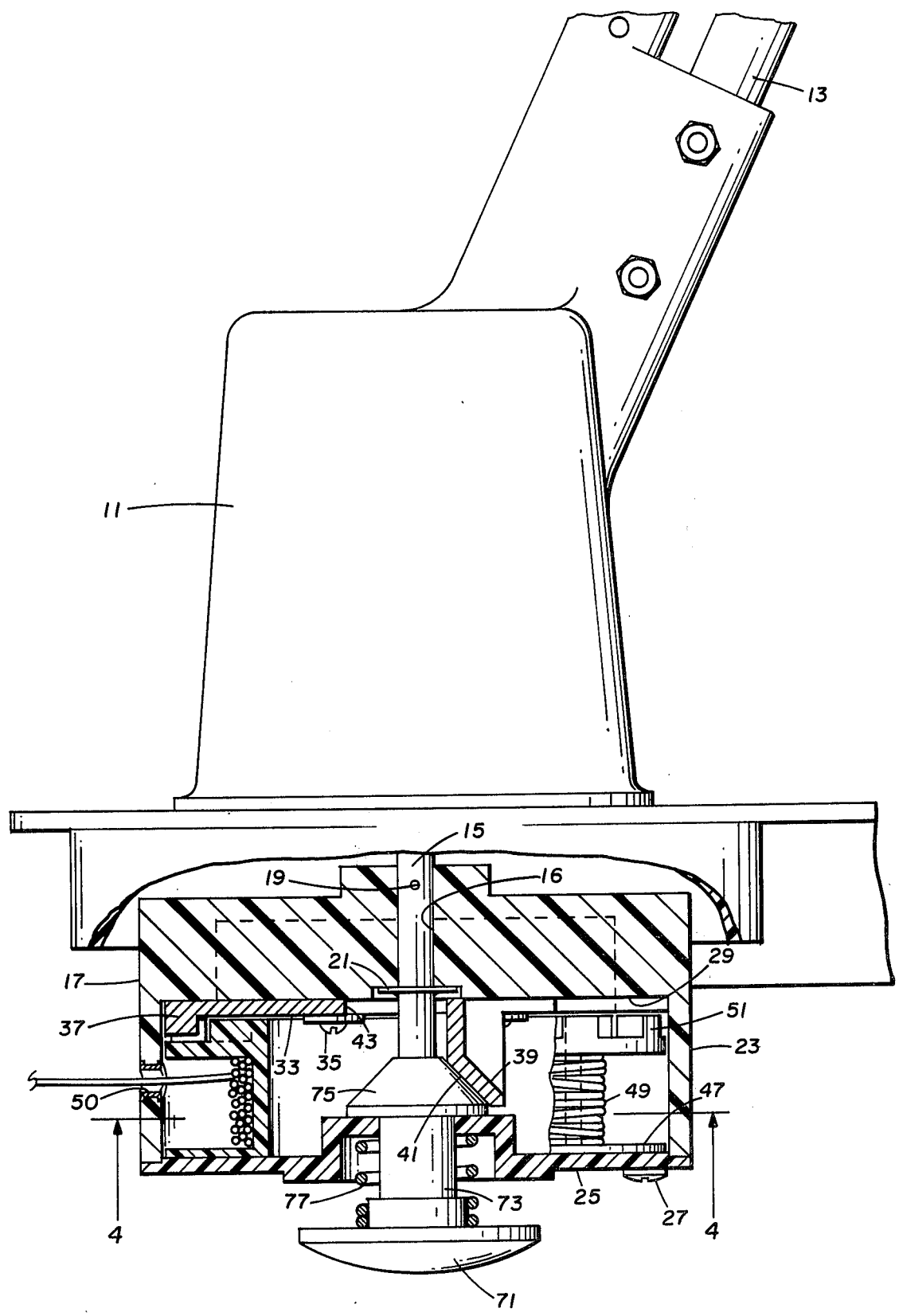
FIG. 1 is a partial cross-sectional view of a filament trimmer constructed in accordance with this invention.

Referring to FIG. 1, a portion of a flexible line trimmer is shown including the electric motor housing 11 which encloses the electric motor (not shown). A handle 13 allows the operator to carry and use the device while standing. A drive shaft 15 depends from the motor and extends from an aperture 16 in housing 17. A locking pin 19 extends transversely through drive shaft 15 and seats within a slot (not shown) withing housing 17 for causing the housing to rotate with the drive shaft. The retainer ring 21 frictionally engages drive shaft 15 and bears against an upper portion of housing 17 to retain it to the drive shaft.

Figure 3:
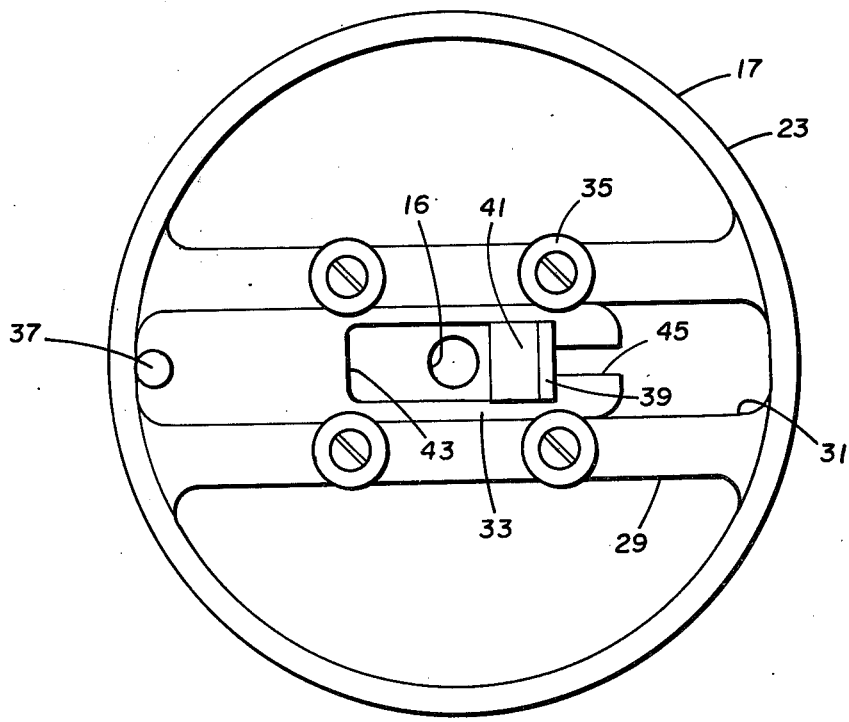
FIG. 3 is a plan view of the bottom of the housing of the filament trimmer of FIG. 1, with the spool removed.

Housing 17 has a cylindrical sidewall 23 and a bottom 25 that is fastened to the sidewall 23 by screws 27. Referring to FIG. 3, housing 17 has a partition 29 formed transversely across its top that has a slot or channel 31 formed in it. An actuator 33 fits within the slot 31, being retained by four screws 35 that allow it to reciprocate within housing 17 in a plane perpendicular to the drive shaft 15.

Actuator 33 comprises a generally rectangular plate with a cylindrical pin 37 on one end protruding downward from the plate. A wedge member 39 protrudes downwardly from the plate near the other end. Wedge member 39 has a tapered surface 41 on its end that inclines at a 45 degree angle with respect to drive shaft 15, and faces generally toward the pin 37. A central opening 43 in the actuator allows the drive shaft 15 to pass through. The wedge member 39 in hollow with a slot 45 formed in the end to lighten the end opposite the pin 37 end. Centrifugal force thus causes the pin 37 to move outward.

Figure 2:
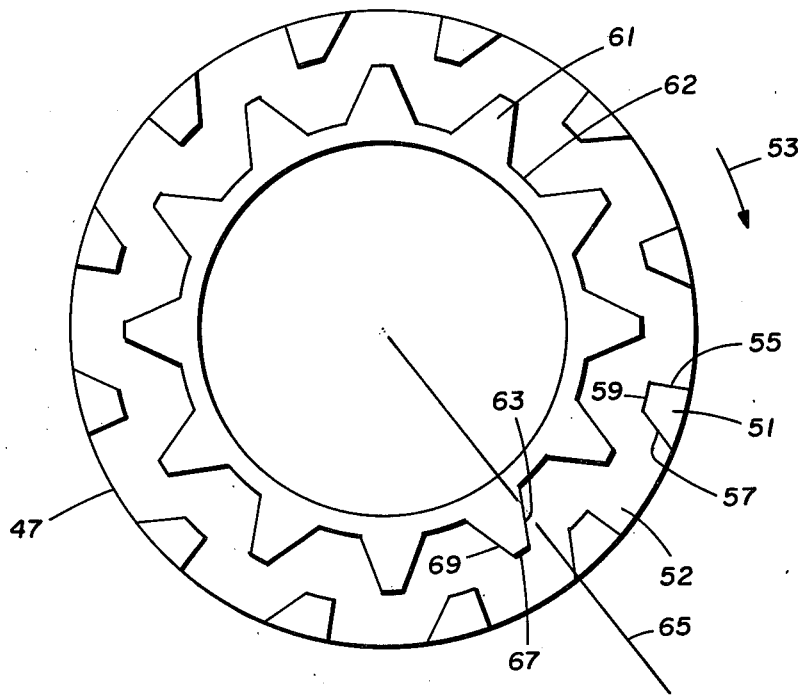
FIG. 2 is a plan view of the upper side of the line spool, shown removed from the filament trimmer of FIG. 1.

A spool 47 adapted to be wound with nylon monofilament line 49 is carried by the bottom 25 of housing 17. The free end of the line 49 extends through an aperture or eyelet 50 in housing sidewall 23. Referring to FIG. 2, spool 47 has a set of drive teeth 51 on its upper side, its lower side being smooth to allow rotation of housing 17 with respect to spool 47. The drive teeth 51 are equally spaced about the perimeter of the spool 47, with spaces 52 between that are approximately 1½ times the width of each tooth. The direction of rotation of the housing is clockwise as viewed from above, as indicated by arrow 53 in FIG. 2. The trailing edge 55 of each drive tooth 51, considering the direction of rotation, lies on a radial line. The leading edge 57 lies on a 45° line with respect to the trailing edge 55. The inner end 59 of each tooth 51 is blunt and lies at a right angle with respect to the trailing edge 55.

A set of guide teeth 61 is formed on the spool upper side radially inward from the drive teeth 51. The guide teeth 61 are equally spaced with spaces 62 between each. Each guide tooth 61 is spaced radially inward from a space 52 between two drive teeth 51. Each guide tooth has a trailing edge 63 that commences on substantially the same radial line 65 that marks the extreme end of the drive tooth leading edge 57. The guide tooth trailing edge 63 is substantially parallel to the drive tooth leading edge 57. The guide teeth 61 have blunt outer ends 67 and leading edges 69 that are symmetrical with the trailing edges 63. The guide teeth outer ends 67 are substantially the same distance from the center of spool 47 as the drive teeth inner end 59. The height of the drive teeth 51 and guide teeth 61 is slightly greater than the height of the actuator pin 37.

Referring to FIG. 1, an actuator button 71 is carried below the housing bottom 25 by an actuator shaft 73 that extends through an aperture in the housing bottom 25. Actuator shaft 73 is axially moveable with respect to housing bottom 25 and has a tapered upper end 75 located above housing bottom 25 and rigidly connected to shaft 73. Upper end 75 is generally conical-shaped, with sides inclined at a 45° angle with respect to drive shaft 15. Tapered end 75 has a central bore (not shown) for slidingly receiving drive shaft 15. Tapered end 75 bears slidingly against the wedge tapered surface 41 to translate axial movement of the button 71 into transverse movement of the actuator 33. A coil spring 77 encircles actuator shaft 73 and is compressed between housing button 25 and button 71, to serve as bias means for urging the button downward.

In operation, spool 47 is wound with line 49, then inserted up over drive shaft 15 until its upper surface bears against partition 29. The free end of line 49 is threaded out eyelet 50 for the desired length, which may be 3-6 inches. Wedge member 39 will be within the central opening of spool 47. The housing button 25 is fastened by screws 27 to retain the spool in place.

Figure 4:
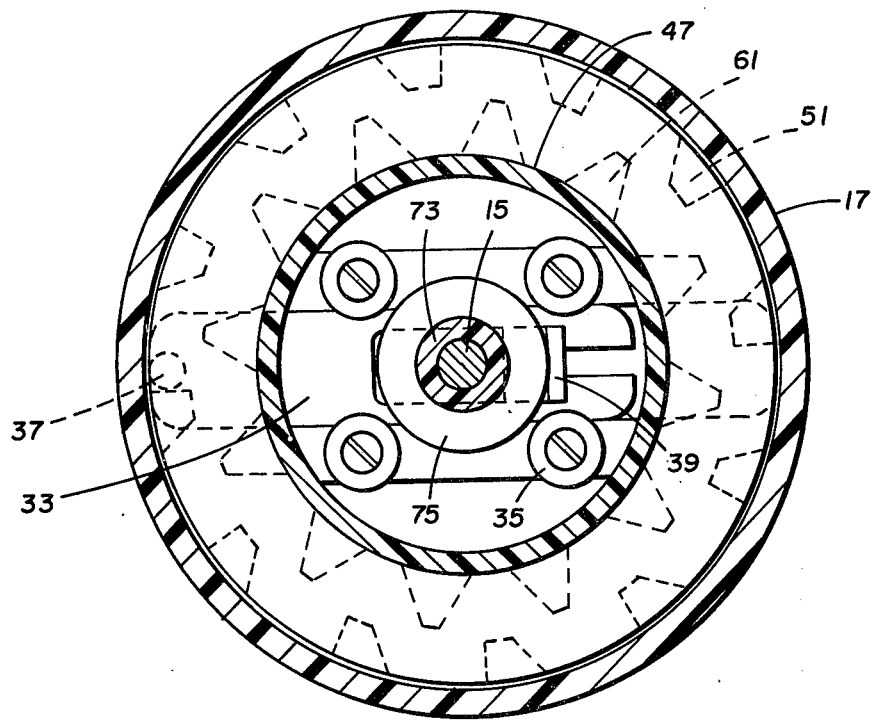
FIG. 4 is a cross-sectional view of the filament trimmer of FIG. 1 taken along the lines IV—IV.
Figure 5:
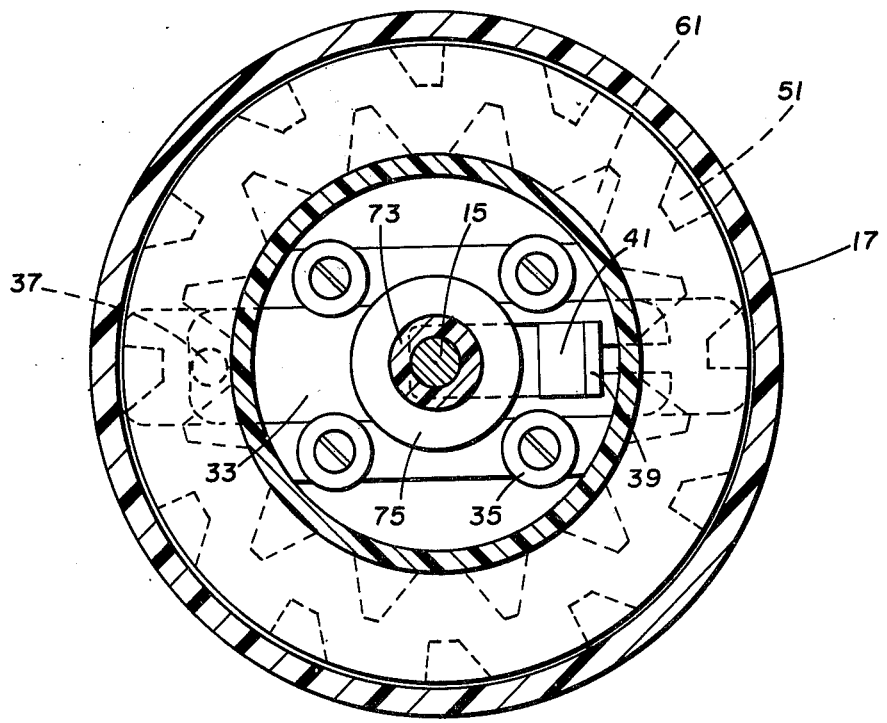
FIG. 5 is a cross-sectional view of the filament trimmer of FIG. 1 taken along the lines IV—IV, with the actuator shown in the disengaged position.

When the electrical motor rotates, centrifugal force urges actuator pin 37 into engagement with one of the guide teeth 51, as shown in FIG. 4. Pin 37 bears against the trailing edge 55, causing the spool to rotate in unison with housing 17. When it becomes necessary to feed out additional line, the trimmer is bumped against the ground, forcing the button 71 and tapered end 75 upward with respect to housing 17. Tapered end 75 slides on the wedge member tapered surface 41, sliding the actuator to the right, as shown in FIG. 5. The tapered end 75 and wedge member 39 serve as translator means for causing upward movement of the button to disengage actuator pin 37 from the drive teeth 51. Since the spool is no longer driven, housing 17 will rotate with respect to it, unwinding more line 49.

Pin 37 will quickly contact the trailing edge 63 of the adjacent guide tooth 61. Cenrifugal force slings the pin into the path of the next drive tooth 51. The spool will continue to slip until the pin engages the trailing edge of the next drive tooth 51. The line thus feeds out a distance proportional to the distance between the trailing edges of two drive teeth.

Once pin 37 leaves the outer end of the guide tooth, it will be in the path of the next drive tooth, thus the guide teeth serve as incremental means for allowing the spool to slip with respect to the housing rotation only a selected amount when the button is depressed.

The housing and its components are installable on existing trimmers. The prior art housing is removed from the drive shaft, which is threaded at the base, by unscrewing the nut on the bottom. Housing 17 is slid up over the drive shaft 15 and retainer ring 21 pushed up against the top of housing 17. The threaded end of the drive shaft will be received within the actuator shaft 73.

It should be apparent that an invention having significant improvements has been provided. The device advances line while the trimmer is rotated simply by bumping the trimmer on the ground. The housing may be installed on existing trimmers since the drive shaft slides within an aperture in the actuator shaft.

While the invention has been shown in only one of its forms, it should be apparent to those skilled in the art that it is not so limited but is susceptible to various changes and modifications without departing from the spirit thereof.

I claim:

1. A flexible nonmetallic filament trimmer comprising:

rotary drive means for swinging a free end of the line;
a housing carried by the rotary drive means for rotation therewith;
an actuator button carried at the bottom of the housing and axially moveable with respect to the housing;
bias means for urging the button downward;
a spool for the line carried in the housing and having a plurality of drive teeth formed on one of its sides;
an actuator mounted transversely in the housing and reciprocal with respect to the housing in a plane transverse to the axis of rotation between an engaged and a disengaged position, the actuator having a pin adapted to bear against the drive teeth when in the engaged position for causing the spool to rotate with the housing;
translator means for causing the upward axial movement of the button to move the actuator and pin out of the engaged position, allowing the spool to slip with respect to the rotation of the housing for feeding out additional line.

2. A flexible nonmetallic filament trimmer comprising:

rotary drive means for swinging a free end of the line;
a housing carried by the rotary drive means for rotation therewith;
an actuator button carried at the bottom of the housing and axially moveable with respect to the housing;
bias means for urging the button downward;
a spool for the line carried in the housing and having a plurality of drive teeth formed on one of its sides;
an actuator mounted transversely in the housing and reciprocal with respect to the housing in a plane transverse to the axis of rotation between an engaged and a disengaged position, the actuator having a pin adapted to bear against the drive teeth when in the engaged position for causing the spool to rotate with the housing;
translator means for causing the upward axial movement of the button to move the actuator and pin out of the engaged position, allowing the spool to slip with respect to the rotation of the housing for feeding out additional line; and
incremental means for allowing the spool to slip with respect to the housing rotation only a selected amount when the button is depressed.

3. A flexible nonmetallic filament trimmer comprising:

rotary drive means for swinging a free end of the line;

a housing carried by the rotary drive means for rotation therewith;

an actuator button carried at the bottom of the housing and axially moveable with respect to the housing;

bias means for urging the button downward;

a spool for the line carried in the housing;

a set of drive teeth formed on the outer edge of one side of the spool with a space between each tooth;

a set of guide teeth formed on the spool inwardly from the drive teeth;

an actuator mounted transversely in the housing and reciprocal with respect to the housing in a plane perpendicular to the axis of rotation between an engaged and a disengaged position, the actuator having a pin on its outer end that is adapted to bear against the drive teeth when in the engaged position for causing the spool to rotate with respect to the housing; and translator means for causing the upward axial movement of the button to move the actuator and pin out of the engaged position, allowing the spool to slip with respect to the rotation of the housing for feeding out additional line, the guide teeth having trailing edges oriented to direct the pin subsequently back into engagement with a drive tooth.

4. The filament trimmer according to claim 3 wherein the drive and guide teeth are formed on the upper side of the spool.

5. A flexible nonmetallic filament trimmer comprising:

rotary drive means for swinging a free end of the line;

a housing carried by the rotary drive means for rotation therewith;

an actuator button carried at the bottom of the housing and axially moveable with respect to the housing;

bias means for urging the button downward;

a spool for the line carried in the housing;

a set of drive teeth formed on the outer edge of one side of the spool with a space between each tooth;

a set of guide teeth formed on the spool inwardly from the drive teeth;

an actuator mounted transversely in the housing and reciprocal with respect to the housing in a plane perpendicular to the axis of rotation between an engaged and a disengaged position, the actuator having a pin on its outer end that is adapted to bear against the drive teeth when in the engaged position for causing the spool to rotate with respect to the housing; and a shaft extending upward from the button and having a tapered upper end for engaging the actuator to cause the actuator to move the pin out of the engaged position, allowing the spool to slip with respect to the housing for feeding out additional line, centrifugal force and the guide teeth subsequently directing the pin back into the engaged position.

6. The filament trimmer according to claim 5 wherein the trailing edges of the drive teeth are formed along radial lines.

7. The filament trimmer according to claim 5 wherein the inner ends of the drive teeth and the outer ends of the guide teeth are located substantially the same distance from the axis of rotation.

8. A flexible nonmetallic filament trimmer, comprising:

rotary drive means for swinging the free end of the line, having a depending drive shaft;

a housing rigidly connected to the drive shaft and having a top and a detachable bottom;

a spool adapted to be wound with line carried in the housing, the spool having a central opening;

a set of drive teeth formed on the outer edge of the upper side of the spool, the drive teeth being equally spaced about the perimeter of the spool with spaces therebetween, and each having a trailing edge that lies on a radial line;

a set of guide teeth formed on the same side of the spool as the drive teeth, each guide tooth positioned radially inward from a space between two drive teeth;

an actuator mounted transversely in the housing and reciprocal in a plane perpendicular to the axis rotation between an engaged position and a disengaged position, the actuator having a pin on one end adapted to bear against the drive teeth when in the engaged position, for causing the spool to rotate with the housing, the actuator having a depending wedge member with a tapered surface, the dimensions and weight of the actuator being selected so that centrifugal force urges the pin into the engaged position;

an actuator button mounted below the housing to an actuator shaft that extends upward through the bottom, the actuator shaft being axially moveable with respect to the housing and having a tapered upper end that engages the wedge member tapered surface so that upward movement of the actuator shaft causes the actuator to move the pin to a disengaged position;

each of the guide teeth having a trailing edge that lies at an angle with respect to the direction of rotation and is of length sufficient to guide the pin into engagement with the next drive tooth; and a coil spring encircling the actuator shaft and compressed between the button and the housing bottom for urging the button downward.

9. The filament trimmer according to claim 8 wherein the actuator shaft has a central opening for slidingly receiving the drive shaft.

10. The filament trimmer according to claim 9 wherein the housing is retained to the drive shaft by a locking retainer ring.

* * * * *